June 22, 1926.

R. DRUCKER

COUPLING DEVICE

Filed April 24, 1924  2 Sheets-Sheet 1

1,590,153

Inventor
R. Drucker
By Marks & Clerk
Attys

June 22, 1926.

R. DRUCKER

COUPLING DEVICE

Filed April 24, 1924     2 Sheets-Sheet 2

1,590,153

Inventor
R. Drucker
By Marks & Clerk
Attys.

Patented June 22, 1926.

1,590,153

UNITED STATES PATENT OFFICE.

RUDOLF DRUCKER, OF DORDRECHT, NETHERLANDS.

COUPLING DEVICE.

Application filed April 24, 1924, Serial No. 708,622, and in Netherlands May 2, 1923.

The present invention relates to a device for coupling shafts, comprising a friction member which, when bringing the gear in engagement, first imparts to both coupling elements equal speeds, but which at the moment that both coupling elements will be brought into engagement releases these elements. It is thereby possible to couple the two elements almost noiselessly, while it gives no difficulty to bring clutches and gear wheels into engagement.

The invention consists in this that the friction member together with the slidable coupling element is adapted to be shifted, whereby spring means, such as pawls or balls, are then also axially displaced over a certain distance and engage recesses in keys or slots arranged in the longitudinal direction of the shaft on which the shifting or sliding movement is effected.

The resistance exerted by those spring means against being forced out of their recesses determines the intensity of the friction which can be exerted by the friction member on the coupling element.

When the pawls or balls are lifted out, a further sliding movement may be effected and the coupling elements be brought into engagement (thrown into gear).

During uncoupling the friction member is moved back by means of projections, or hook bolts or at least brought to its original position or therein maintained.

The accompanying drawings illustrate the invention by way of example more or less schematically.

Figure 4:
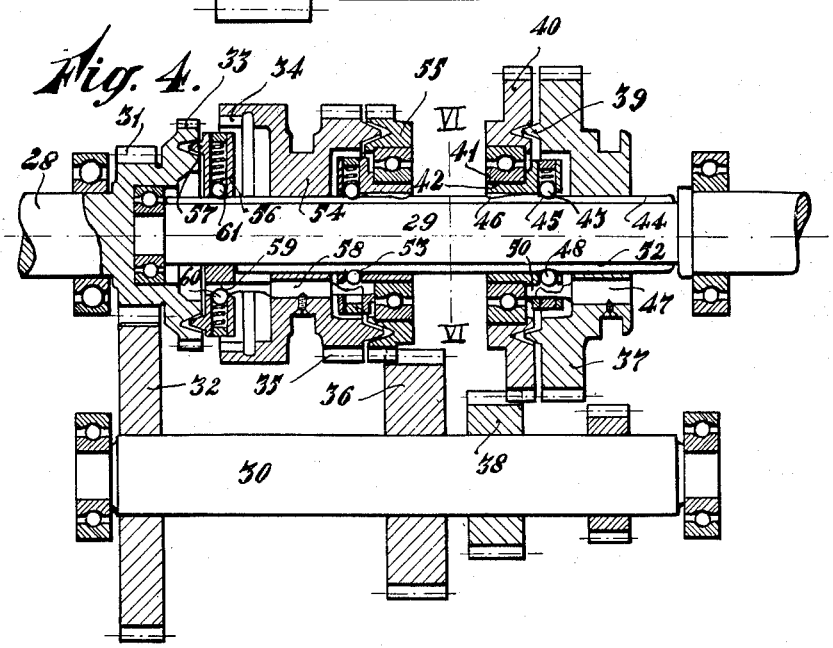
Fig. 4 is a section of a change speed gear for motor cars.
Figure 6:
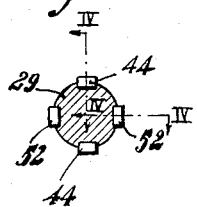

Fig. 6 a section on the line VI—VI in Fig. 4.

The shafts 1 and 2 are to be coupled. It is assumed that e. g. the shaft 2 is stationary and the shaft 1 rotates. On the shaft 1 the gear wheel 3 is keyed by means of the key 4 on which the wheel may be moved axially. On a machined flange of the hub of the wheel 3 the rim of gear wheel 5 can freely rotate in such a manner that the teeth of 5 in the extreme left position over a certain portion of the length are still in engagement with the teeth of the wheel 6 keyed to the shaft 2 to be driven.

Secured on the shaft 1 is further a disc 7, which can not rotate about the shaft but is slidable in axial direction on the key 4. This disc 7, at the place of the key 4, is provided with a radial bore 8 containing a helical spring 9 enclosed at the upper slide by the screw 10 and pressing at the lower side on a ball 11. This ball is pressed in a cup-shaped recess 12 provided in the upper surface of the key 4. When the disc 7 is shifted to the right, the ball 11 tends to compress the spring 9 and thereby offers a resistance before it is pressed out of the cup upwards on the top side of the key. Now the track of the ball on the key is constructed in such a manner that over a portion from $a$ to $b$ the ball must ascend and compress the spring whereupon the path descends from $b$ to $c$ and merges into a recess similar to 12.

The side of the rim of gear wheel 5 is provided with a trapezium-shaped recess 13 into which fits a corresponding ridge 14 on the adjacent side of the gear wheel 3 in such a manner that the two wheels are compelled to rotate together by frictional contact when they are pressed against each other in axial direction.

The operation is as follows. The rim of gear wheel 5 is at rest by reason of the fact that the teeth engage the stationary wheel 6, that is to say the gear wheel 3 rotates with the shaft 1 within the wheel 5. Now when the wheel 3 is moved to the right then the rim of gear wheel 5 is clamped between the disc 7 and the friction surface of the wheel 3 till the friction grows so large that the rim of gear wheel 5 also begins to rotate and consequently the wheel 6 and the shaft 2. In this manner the wheel 6 gets exactly the right speed for engaging with the wheel 3. Of course the three wheels 3, 5 and 6 have entirely similar teeth. At this moment the wheel 3 may be brought into engagement with the wheel 6 noiselessly and without shocks.

Now it could occur, however, that the teeth of 5 would not register with the teeth of 3 and that consequently a further sliding movement would not be possible. This difficulty is overcome by the fact that just prior to the moment that the edge $a'$ of the wheel 3 would enter into the wheel 6 pressure of 7 against the side of the rim of gear wheel 5 is removed. The inclination namely of the contact surface of the ball 11 on the key over the length $a$, $b$ corresponds to the distance to be traveled by the wheel 3 before it can come into engagement with the wheel 6.

In the drawing characters $a$, $b$, $c$ indicate the different positions of the ball 11, and at the same time the corresponding positions of the edge of gear wheel 3. The teeth of the wheel 3 in the position of engagement are indicated by a dotted line.

In order to move the disc 7 back to the left when throwing out the clutch, the wheel 3 is provided with bolts, the heads of which engage the disc.

It is of course possible to arrange a plurality of keys 4 on the shaft and a plurality of balls 11 and in practice a plurality of bolts 15 should be used. The friction of the rim of gear wheel 5 on the hub of the wheel 3 may be reduced by the application of a bushing or by the use of a ball bearing for the rim of gear wheel.

Figures 1, 2:
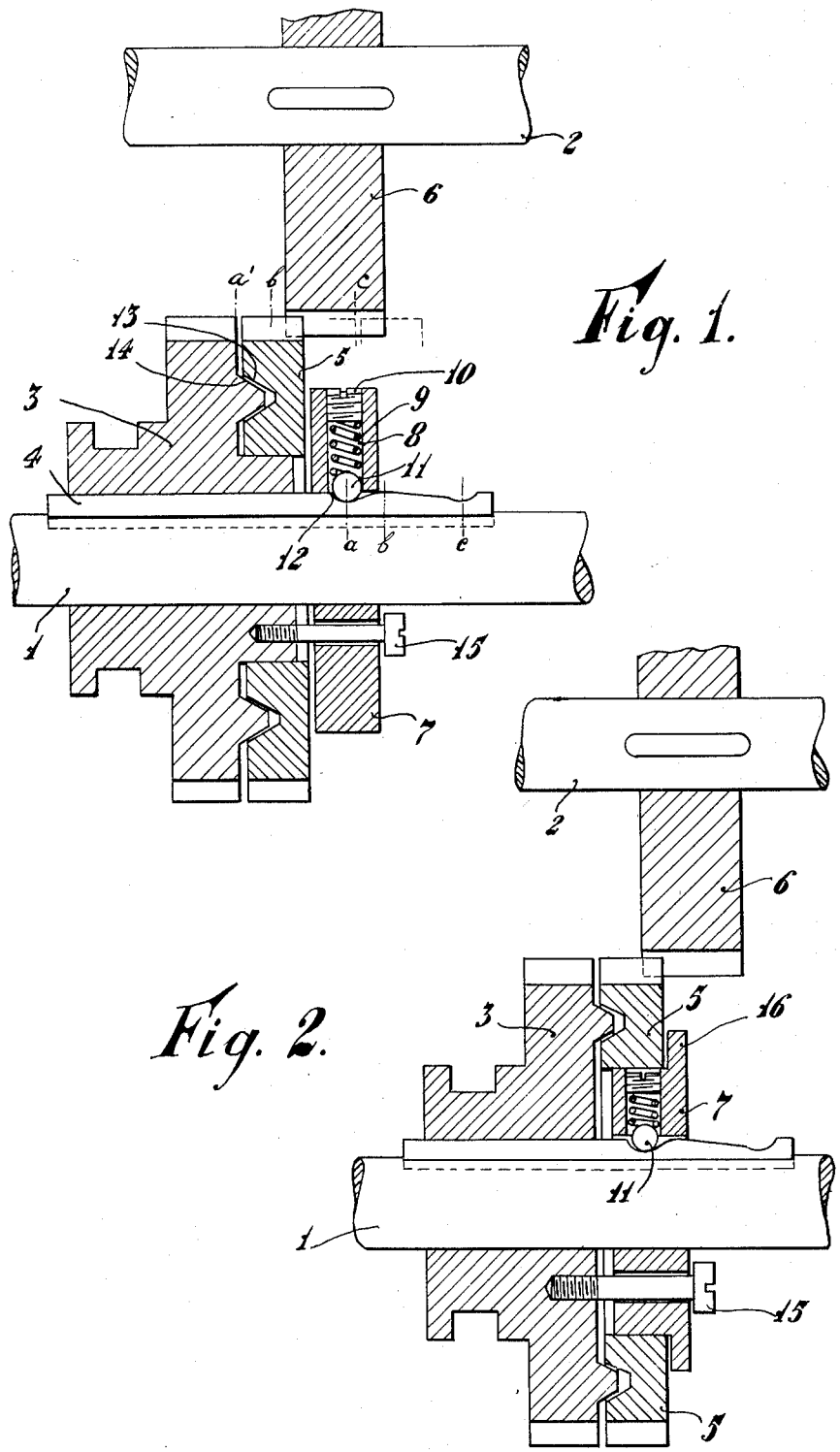
Fig. 1 is a section of a coupling device for two parallel shafts by means of gear wheels.
Fig. 2 is a modification of this device.

Fig. 2 shows another embodiment, in which the rim of gear wheel 5 does not rotate on a machined portion of the wheel 3 but on the hub piece 7 provided with a flange 16; for the rest this embodiment is similar to that of Fig. 1.

Figure 3:
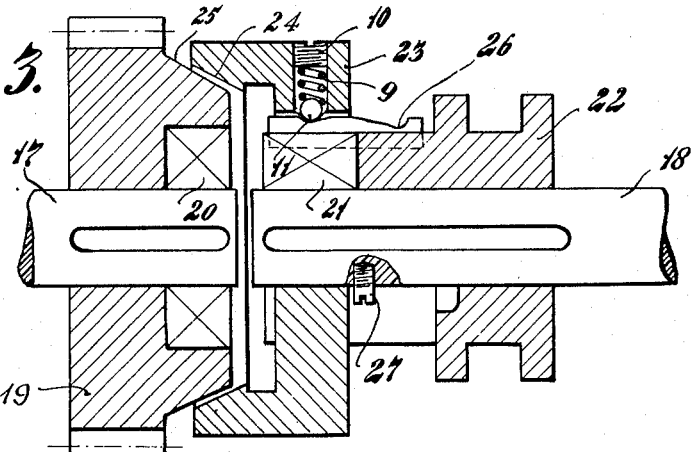
Fig. 3 is a section of a coupling device for two shafts which are in alignment, by means of clutches.

Fig. 3 shows an embodiment of the device in which two aligned shafts are to be coupled by a claw-coupling.

The shaft 17 remains stationary, the shaft 18 is driven. The piece 19 is rigidly connected to the shaft 17 and provided with claws 20 engaging claws 21 of a piece 22, slidably but non-rotatably mounted on the shaft 18.

The piece 23 is non-rotatably but slidably mounted on the sleeve 22. The attachment of these two pieces is effected by means of keys and resilient balls, corresponding to the keys and balls of Figures 1 and 2. The friction member 23 is provided with a conical friction surface 24, adapted to co-operate with a corresponding surface of the piece 19.

The question corresponds to that described in connection with the embodiment according to Fig. 1. For coupling in, the sliding piece 22 is shifted to the left and the friction member 23 engages by means of the cone 24 the piece 19, so that the speed of the shaft 17 becomes equal to that of the shaft 18. Upon further displacement the ball 11 moves over the incline of its track and the friction is released; thereupon the claws of parts 20 and 21 are brought into engagement.

Uncoupling the friction member 23, the ball 11 remains in the recess 26 and is pulled along to the right. The shaft 18 is provided with a stop 27, whereby the friction member is returned to its original position.

The number of keys and stops 27 may of course be varied in this embodiment also.

In Fig. 4 the motor shaft is indicated by 28, the main shaft of the gear box by 29 and the intermediate shaft by 30. The counter shaft is rotated from the motor shaft by the gear wheels 31, 32. The parts 33, 34 are for the direct drive, the wheels 35, 36 for the second speed, the wheels 37, 38 for the first speed.

The construction of the various parts corresponds mainly to that already described. The wheel 37 is not rotatably but slidably mounted on the shaft 29. On the outer side of the said gear wheel 37 a double friction cone 39 is provided fitting into a corresponding cavity of a rim of gear wheel 40. This rim of gear wheel is by means of the ball bearing 41 rotatably mounted on the hub piece 42, provided with balls 43, already known from the preceding construction.

It is assumed that the lateral pressure to which the rim of gear wheel 40 is subjected during the coupling operation is transmitted by the ball bearing to the hub piece 42.

Figure 5:
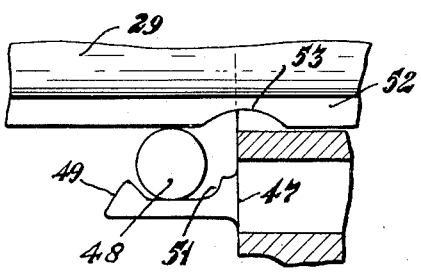
Fig. 5 is a detail.

In the upper surface of the key 44 recesses 45 and 46 are provided entirely corresponding to those in the foregoing figures. The throwing in of the wheels 37, 38 is effected in the same manner as above described. The device for moving back the parts 40 and 42 however is otherwise. It comprises a pin 47 of special form which is secured in the gear wheel 37 and further it comprises a loose ball 48. When the gear wheel 37 is moved to the left for the purpose of coupling, then the inclined front end 49 of the pin 47 lifts up the ball 48 and the pin can then pass through the hole 50 and the friction member is pressed on. The ball 48 now lies in the recess 51 of the pin and can move on the key 52 together with the gear wheel 37 and the hub piece 42 (see also Fig. 5).

Now, for the purpose of uncoupling, when the gear wheel 37 is retracted to the right, then the ball 48 prevents the pin 47 from being pulled out and the pin and the ball together act to move back the parts 40 and 42. This is effected until the ball 48 can drop into the recess 53 in the key 52. At this instant the rim of gear wheel remains stationary and the pin can be withdrawn from the hole. It is hereby prevented that the gear wheel 40 is pulled still farther to the right. This should not be permitted, as then the gear wheels 40 and 38 would not remain engaged.

For throwing in the direct drive and the second speed a common sliding piece 54 is used. To one side this sliding piece acts on the the friction rim of gear wheel 55 for putting in the second speed, to the other side it acts on the friction member of the hub piece 56 for putting in the direct drive.

The device for throwing in the second speed is similar to the device above described, however that for the direct drive differs therefrom.

The disc 56 is provided with a double friction cone 57 fitting into a corresponding recess in the part 33. As soon as this disc is forced to the left, frictional engagement is effected and the two parts 33, 34 and the shaft 29 receive the same speed. This pressing on of the disc or friction member 57 is effected by means of pins 58 which are mainly similar to the pins 47. The front end 59 of this pin presses against the ball 60, on which a spring is pressing, and thereby displaces or shifts the whole friction member to the left. This pressing on of the friction member is effected so long till the ball 60 is lifted by the inclined end of the pin 58 and the pin can pass, whereupon the coupling elements 33 and 34 are brought into engagement.

When uncoupling the operation is similar to that described for the first acceleration and the friction member is pulled to the right together with the sliding piece 54. A stop on the shaft 29, in the drawing the endface of the key 52, prevents the friction member 57 from being carried along too far.

The ball 61 has for its object to retain the friction member 56 in its extreme right position.

For a good comprehension of the invention it may be remarked that the pins 47 as well as a pin 58 appear twice on the circumference. The same applies to the balls 43 and 61 and the keys 44 and 52. The section shown in Fig. 4 is therefore partially (above the centre line) a vertical section and partially (under the centre line) a horizontal section on the lines IV—IV in Fig. 6.

Having now particularly described and ascertained the nature of my said invention and the manner in which the same is to be performed, what I claim as new and desire to secure by Letters Patent is:

1. In a change speed gear of the character set forth in combination, a shaft, longitudinal stationary tracks thereon provided with recesses, friction members shiftably mounted on said shafts, slidable positive coupling elements mounted on said shaft and cooperating with said friction members, resilient means in connection with the friction members and cooperating with the recesses in said tracks, and means cooperative with the positive coupling elements having projections which when the coupling elements are moved axially are adapted to act on the resilient means in the friction members.

2. A change speed gear including a shaft, longitudinal keys thereon provided with recesses, a slidable gear wheel on said shaft, another shaft parallel to the first shaft, means on said last mentioned shaft for establishing a positive coupling connection with the gear wheel, a friction gear wheel cooperating with the first mentioned gear wheel shiftably mounted on said shaft, spring pressed balls in the hub part of said friction gear wheel and engaged by the recesses in the longitudinal keys for keeping the friction gear wheel in predetermined position after the same has been shifted together with the slidable gear wheel.

3. A change speed gear comprising in combination a motor shaft, a gear wheel thereon, a main shaft in alignment with the motor shaft, a gear wheel on the main shaft, a countershaft parallel to said shafts, a gear wheel on the counter shaft, a sliding member on the main shaft, gear wheels at both sides of the sliding member one of which is adapted to clutch with the gear wheel on the motor shaft and the other adapted to mesh with the gear wheel on the counter shaft, a friction member shiftably mounted on the main shaft and cooperating with the gear wheel on the motor shaft, a friction member shiftably mounted on the main shaft and cooperating with the gear wheel on the countershaft, longitudinal keys in the main shaft provided with recesses, resilient means in both friction members cooperating with the recesses in the keys, and means adapted to coact with the resilient means in the friction members.

In testimony whereof I affix my signature.

RUDOLF DRUCKER.